United States Patent Office 3,157,518
Patented Nov. 17, 1964

3,157,518
COATINGS OF CELLULOSE CRYSTALLITE
AGGREGATES
Orlando A. Battista, Drexel Hill, Pa., assignor, by mesne assignments, to FMC Corporation, San Jose, Calif., a corporation of Delaware
No Drawing. Filed Feb. 23, 1960, Ser. No. 10,072
4 Claims. (Cl. 99—166)

This invention relates to coatings or deposits for a variety of base or basis surfaces and to the resulting coated structures, and it provides various and sundry advantages, depending on the basis structure or material. As will be described in detail, the coatings may be protective, or serve to laminate a pair of adjacent surfaces or structures, or improve a given surface as by making it smooth, rendering it non-blocking, or abrasion resistant, or more compatible for subsequent other coatings, etc. Edible as well as protective coatings are provided, and also coatings that may be decorative, or lubricative, or electrically insulating.

In essence, the invention comprises a structure or basis material having on at least one surface thereof a coating or deposit of cellulose crystallite aggregates that are characterized by having an average level-off D.P. (degree of polymerization) in the range of 15 to 375 anhydroglucose units.

The basis material may be of any suitable kind, for example glass, wood, metals, plastics, ceramics, stone, rubber, plaster, cork, paper, painted surfaces, food, etc. The basis material may be in any stage of manufacture, processing, or fabrication, including the raw, untreated or bulk form of the material, and it may have any suitable structural form, size or shape.

The cellulose crystallite aggregates are products obtained by the controlled acid hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose. As the aggregates are of unusual interest, they will be described in some detail.

In the acid hydrolysis, the acid dissolves amorphous portions of the original cellulose chains, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various acids, a direct method which is free of secondary reactions, and which is employed in the present invention, comprises the treatment of the original cellulosic material with 2.5 normal hydrochloric acid solution for 15 minutes at boiling temperature. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

It may be observed that "crystallite," as used herein, is a cluster of longitudinally disposed, closely packed cellulose chains or molecules, and that "aggregates" are clusters of crystallites. The aggregates may also be said to comprise straight, rigid, relatively non-twistable groups of linear chains. As indicated by X-ray diffraction tests, the crystallites and crystallite aggregates have a sharp diffraction pattern indicative of a substantially crystalline structure. Although the crystallite chains are of very uniform lengths, particularly by comparison with the original cellulose chains, strictly speaking they do exhibit some variation, and for this reason it is preferred to speak of average length, or of average level-off D.P. values.

The hydrolysis method noted above is particularly characterized in that in each crystallite aggregate resulting from the hydrolysis, no constituent chain is connected to a chain in a neighboring aggregate; rather all the chains in an aggregate are separate from and free of those in neighboring aggregates.

The cellulose crystallite aggregates, or level-off D.P. cellulose, suitable for use in the invention is characterized by having a preferred average level-off D.P. of 125 to 375 anhydroglucose units. Ideally, within this range all of the material should have the same D.P., or chain length, but as this is difficult if not impossible to achieve, it is preferred that at least 85% of the material have an actual D.P. not less than 50 and not more than 550. More preferably, at least 90% of the material should have an actual D.P. within the range of 75 to 500, and it is still more preferred if at least 95% of the material has an actual D.P. in the range of 75 to 450. It may thus be apparent that the chain length of the level-off D.P. cellulose, or cellulose crystallite aggregates, is very uniform, a consequence of the hydrolysis, wherein the longer chains of the original cellulose were converted to shorter chains and the very short chains were dissolved away. In short, the hydrolysis effected a homogenization of the chain length distribution. As may also be apparent, a reference to crystallite aggregates having an average level-off D.P. of 125 means that the aggregates have an average chain length corresponding to 125 anhydroglucose units, and in accordance with the first preference noted above, at least 85% of this material will be made up of chains containing 50 to 550 such units; the remaining 15% may comprise shorter and/or longer chains.

More preferably, the average level-off D.P. is in the range of 200 to 300, of which material at least 90% has an actual D.P. in the range of 75 to 550.

Associated with the foregoing D.P. properties of the crystallite aggregates is the fact that their chemical purity is very high, the material comprising at least 95%, preferably at least 97% or 99%, polyglucose, or anhydroglucose units, based on chromatographic analysis. In terms of ash content, the aggregates preferably contain less than 100 p.p.m. (parts per million), although ash may range from about 10 to about 400 or 500 or 600 p.p.m. By comparison, conventional fibrous cellulose may have 1000 to 4000 p.p.m. of ash. In connection with the purity of the aggregates, it may be explained that the inorganic contaminants in the original cellulose, which are concentrated in the amorphous regions thereof, are dissolved away by the hydrolyzing acid, and the non-cellulose components of the original material are so effectively destroyed that their concentration is reduced to a very low level. Of interest is the fact that the chains produced by the hydrolysis each have on one end thereof a potential aldehyde group, such group being in the 1 carbon position of an end anhydroglucose unit and requiring the assistance of the ring oxygen atom, which is ortho to it, to realize its aldehydic potential. The group has the reducing properties of an aldehyde group.

The source material for the crystallite aggregates may suitably be one or more natural fibers such as ramie, cotton, purified cotton, also bleached sulfite pulp, bleached sulfate wood pulp, etc. Particularly suitable are sulfite pulp which has an average level-off D.P. of 200 to 300, at least 90% of which has a D.P. in the range of 75 to 550; and also sulfate pulp which has an average level-off D.P. of 125 to 175, at least 90% of which is in the range of 50 to 450.

The aggregates in the dry state are in finely divided, usually powdery form, the particle size being in the range of from less than 1 micron to 250 to 300 microns. Within this range, the particle size and size distribution are variable, it being understood that the size and size distribution will be selected to suit a particular coating and end use. Aggregates within the foregoing size range may be prepared by subjecting the product of acid hydrolysis to mechanical disintegration to produce a material having a size in the range of less than 1 to about 250 or 300 microns.

It is also possible to use crystallite aggregates having lower average level-off D.P. values, say in the range of 60 to 125, or even 15 to 60. Aggregates from both of these ranges have the chemical purity, moisture content, particle size, and other characteristics noted above. Crystallite aggregates in the 60 to 125 average level-off D.P. range are obtainable from the acid hydrolysis of alkali-swollen natural forms of cellulose, of which a preferred source is cellulose that has been mercerized by treatment with 18% caustic soda solution at 20° C. for two hours. Aggregates in the 15 to 60 average level-off D.P. range are suitably prepared from regenerated forms of cellulose, including tire and textile yarns, other regenerated cellulose fibers, and cellophane.

As obtained from the acid hydrolysis and water washing steps, the aggregates in the over-all average level-off D.P. range of 15 to 375 are in a loosely aggregated state and are characterized by the presence of many cracks in their surfaces, including similar surface irregularities or phenomena like fissures and notches. Because of such irregularities, the apparent or bulk density of the aggregates is much less than their absolute density. Furthermore, the cracks, etc. persist despite the application of high compressive forces on the aggregates. Thus, when they are compressed at 5,000 p.s.i., they exhibit an apparent density of 1.26; at 10,000 p.s.i. the apparent density rises to 1.32; at 15,000 p.s.i. it is 1.34; and at 25,000 and 37,000 p.s.i. it is 1.38 and 1.38, respectively. On the other hand, the absolute density of a unit crystal or crystallite is 1.55, from which it is apparent that the aggregates occlude considerable quantities of air in the surface cracks and fissures.

Mechanical disintegration of the aggregates, as referred to above, may be carried out in several ways, as by subjecting them to attrition in a mill, or to a high speed cutting action while suspended in an aqueous medium, or to the action of high pressures on the order of at least 5,000 or 10,000 p.s.i. These disintegration procedures are carried out to such an extent that the resulting disintegrated aggregates are characterized by forming a stable dispersion when dispersed in an aqueous medium, that is, a dispersion from which the aggregates will not settle out but will remain dispersed indefinitely; furthermore, such aggregates are additionally characterized by forming a gel when the amount of aggregates dispersed in the aqueous medium is, preferably, about 3% or more by weight of the dispersion. In accordance with the invention, these aqueous dispersions and gels are used to form coatings or deposits on a basis surface. It is preferred that the concentration of aggregates in the aqueous dispersions shall be at least 0.1% by weight, and more preferably at least 0.5 or 0.6%. Usually, the gels are thixotropic when they contain about 8 to 10% or more of the aggregates. The aggregates' content of the gels may be as high as desired, being limited only by the capacity of the gel to be applied, as by means of a doctor blade, to a surface to give a smooth continuous coating. In practice, the aggregates' content of the gels may range to 25 or 30% by weight, gel basis. The dispersions and gels are simply applied to a surface in any desired way and then dried to produce the coating or film. The films are continuous and self-adherent, but are readily removable from a surface by the application of water without damage to the underlying surface.

Following mechanical disintegration of the aggregates, it is desirable to fractionate them into fractions having a more homogenous particle size distribution. Thus, using such separation procedures as mechanical sifting, settling in water, or centrifuging, a number of useful fractions may be obtained, including (1) a fraction having a particle size of up to 0.2 micron, which produces very clear, transparent films from aqueous dispersions and gels having a wide range of pH, say pH 2 to 11; (2) a fraction having a size of up to 1 micron, from which colorless films are obtained over a pH range of about 4 to 10; (3) a fraction having a size of up to 2 microns which also produces colorless films over a pH range of about 4 to 10; (4) a fraction having a size of 1 to 5 microns, the films from which begin to show a slight haze, and the preferred pH range being about 6 to 10; (5) a 1 to 10 microns fraction which produces milky films from a dispersion or gel having a pH of about 6 to 10; (6) a fraction having a size range from 1 to more than 10 microns which produces opaque films from dispersions or gels having a somewhat higher pH, say pH 7 to 11. A desirable way of obtaining the foregoing fractions is to take the aqueous dispersion or gel, either of which may be termed a suspension, resulting from the mechanical disintegration step, dilute the same with water so that the content of aggregates is about 1% by weight or less, let the resulting suspension stand for several hours or until the upper layer has a smooth opalescent appearance, and then to separate such opalescent layer as by decanting. It will be found that the opalescent layer contains particles of up to 5 microns in size. To obtain fractions of smaller sizes, the opalescent layer may be centrifuged. Preferred fractions are those of particle sizes of up to 2 microns, that is, fractions (1), (2) and (3). Preferably, too, each dimension of the particles should be within the size range noted for each fraction; in order words, fraction (1), for example, should be made up of particles all of whose dimensions are up to 0.2 micron; however, particles having two dimensions within the size range are quite useful, as are particles having one dimension within the size range although they are less preferred. These considerations also apply to the other fractions described.

The films or coatings produced from the foregoing fractions are all continuous; in particular, those obtained from the fractions of less than 1 micron size are further characterized by their homogeneity, and also by their toughness and adherence; thus, they cannot be scratched or removed by means of one's fingernail but rather require the use of a razor or other sharp blade for this purpose. All of the films are visible; and they are permeable to gaseous materials. It may be noted, in connection with the colorless or transparent films produced from particles of up to 1 or 2 microns, that the dispersions and gels of such particles are also colorless.

As indicated, the aggregates are of value for coating basis materials of widely varying kind and form. Illustrative of these applications is the deposition of dispersions and/or gels of the aggregates on glass. Glass coated with a dispersion wherein the particles are up to one or two microns in size, preferably up to one micron, will, on drying, have formed on it a colorless, continuous, and self-adherent film which is resistant to scratching away by fingernail but removable by the application of water, preferably heated water and/or containing a conventional detergent. After removal of the coating, the glass surface remains unaltered, as in its initial condition. Glass coated with a thixotropic gel, or with a dispersion containing particles larger than 10 microns, will, after drying, have on it a white opaque coating such that it resembles frosted glass. Where the coated surface is large enough, desired indicia may be applied to it, as by means of a pencil, pen, crayon, etc., thus providing a simple inexpensive removable means for marking bottles, beakers, various laboratory equipment, and other articles.

The coatings are of particular value when applied to glass filaments and fibers, which normally have a harsh hand or feel and poor resistance to abrasion when rubbed together, and which, because of these inherent characteristics, necessitate special handling to convert them into textile products. Coatings of aggregates, when applied to glass filaments and fibers, are extremely adherent thereto. Preferably, dispersions containing the smaller sized particles, say up to 2 microns, are employed for this purpose. As a result, the abrasion resistance of the filaments is substantially increased, approaching that of cotton and regenerated cellulose fibers and filaments, and allowing them to be processed on conventional textile equipment. Being hydrophilic, the coatings permit the application of conventional yarn finishes, as normally applied to cotton and regenerated cellulose fibers and filaments, thereby further simplifying the converting of the glass filaments and fibers into textile products. A great number of conventional yarn finishes are satisfactory, and where desired, both the finish and the coating of aggregates may be removed after they have served their purposes, as by scouring with hot water containing a detergent. Suitable yarn finishes include those disclosed in U.S. Patent No. 2,663,989, which comprise aqueous emulsions or dispersions containing, by weight, 2 to 10 parts of a water-dispersible polymeric colloid, 1 to 15 parts of an emulsifier such as a polyethylene glycol ether of a compound like castor oil or hydrogenated castor oil and containing from about 80 to 200 ethoxy groups per molecule, 1 to 5 parts of an alkaline buffer, and about 0.5 to 15 parts of a lubricant comprising at least 0.5 part of a waxy partial ester of an anhydro-hexahydric alcohol and a fatty acid having at least 16 carbon atoms. The amount of water may vary, depending upon the specific use and the amount of finish desired of the filaments. A specific yarn finish is illustrated by the following emulsion, made as described in the aforementioned patent and containing, by weight: 0.25 part of polyvinyl alcohol, 0.25 part of sodium oleate, 0.2 part of sorbitan monopalmitate, 0.4 part of castor oil modified with ethylene oxide (about 127 ethylene oxide groups per mole of castor oil), and 85 parts of water. The finish is applicable to the coated glass filaments by passing them through the emulsion and then between suitable rollers to remove excess quantities of the emulsion. The filaments are then dried and may be woven into a fabric on conventional textile equipment as employed for forming fabric from regenerated cellulose yarns.

The coatings are applicable to the wrapping or packaging of food, for which purpose they have the distinctive advantage of being edible. For example, a frozen mass or block of food, such as quick frozen corn, peas, beans, or other vegetable, may be given a transparent or opaque coating, as by dipping into an aqueous dispersion or gel, and such coated block, together with other like-coated blocks, may be packaged in an overall container having say 2 to 6 blocks per container. Such use of the coating eliminates the need and expense of separately wrapping each block in paper or foil, and also spares the user the trouble of unwrapping, as the blocks may be transferred directly to a pan and heated without removing the coating. The coatings are applicable to frozen vegetables in general, and also to frozen meats, ice cream, frozen confections, butter, cheese, and the like. The crystallite aggregate coatings not only serve as self-contained packaging films but also they tend to keep the packaged food fresh by retarding its rate of dehydration. For example, food such as chicken legs and chicken breasts may be improved in this respect by means of the coatings. Egress of moisture from the food to the atmosphere is decreased, and similarly, pick-up of moisture from the atmosphere is also reduced. As the result, the storage qualities of food are enhanced.

In respect of their use as edible packaging materials, it is to be observed that the crystallite aggregates and coatings made from them are bland in taste and odor, and are edible but not nutritious, that is, they do not add calories to the diet. Furthermore, they have a very acceptable chewing quality and mouth feel, and their taste becomes so closely identified with that of the packaged food as to be indistinguishable from it.

Where desired, films and coatings of increased strength for packaging food may be obtained by adding to the aqueous dispersions and gels of the aggregates one or more additives comprising conventional water-soluble edible film-forming polymeric materials such as carboxymethylcellulose, methyl cellulose, polyvinyl alcohol, and the like. These materials are protective colloids and are each capable of forming continuous films. When the resulting dispersion or gels are used to coat a surface, the coatings so formed incorporates the additive and has enhanced strength. While films produced from the additives are stronger than those of the aggregates, they tend to be tough and rubbery and thus they have an unsuitable chewing quality. However, by using a mixture of the aggregates and additives there may be obtained films having the desirable chewing quality of the aggregates and at the same time improved strength characteristics. While the proportions of the aggregates and the additives are variable, the latter should be employed in minor amounts, preferably from 1 to 30% by weight of the aggregates in the dispersion or gel, and more preferably from 1 to 10%.

Coatings and films from mixtures of the aggregates and additives, as just described, are of value in non-food applications, as for coating paper, plaster walls, etc., where a tough, opaque and yet glossy finish is a decided advantage. Such coatings, by virtue of the content of the additives per se and have a controllable texture owing to the fact that the particle size of the aggregates is controllable. Preferably, higher amounts of the additives are employed for these non-food applications, going up to say 30 to 50%.

Metal surfaces may be coated or filmed with the gels or dispersions to obtain decorative and/or protective effects. The dispersion or gel may incorporate a suitable dye, particularly where a decorative result is desired. Dispersions containing aggregates of up to 1 micron size are useful to fill up small surface pits or crevices in the metal surface and thus improve the same for receiving subsequent coatings or finishes of any desired kind. Long-lasting lubrication, or rust-proofing of a metal surface such as iron or steel, may be provided by incorporating an oleaginous material in the aqueous dispersion or gel, then applying the latter to the surface, and drying the same, there being obtained an oil-bearing film or coating comprising the crystallite aggregates having the oleaginous material not only adsorbed on them but also tenaciously absorbed thereon. A part of the adsorbed oil is transferred to the metal surface by capillary action, and as it is used up, additional amounts are transferred from the crystallite aggregates to the surface. The adsorbed oil on the aggregates is, of course, available for immediate lubrication of the surface. Any metal may be coated, and any other surfaces requiring lubrication, besides those of metal, may be benefited in this way. The oleaginous material may be a mineral, animal or vegetable oil of any suitable kind and from any source.

Another application of aggregate-coated metal surfaces, particularly coated metal plates, is in electrical condensers where the coating on the metal plates may replace conventional paper dielectrics or insulators. The aggregate coating comprises a superior dielectric material, having a dielectric constant and a power factor equal to or better than that of vulcanized fiber. A further advantage of the aggregate coating is that it may be deposited on a metal surface in the form of very thin continuous films, say 1 to 2 microns thick, as well as thicker films or coats of any desired thickness. These films are preferably transparent, being formed from aggregate particles of less than 1 micron size, or from particles of up to 2 microns. In this connection, the very high purity of the crystallite aggregates makes them of particular value in many instances where high purity is a requirement.

Similarly, decorative and/or protective coatings may be applied to wood, plaster, and other surfaces. The coatings are of value as size and primer coats in that they are capable of smoothing out surface irregularities and tend to be more compatible with, and receptive to, subsequent coatings, like paint, than the surface on which they are laid down. Varying textural effects and/or opacities are obtainable by varying the particle size of the aggregates employed to form the dispersions and gels. By adding a wet strength cross-linking resin incorporating a self-contained catalyst to the aggregate dispersions or gels, and applying the resulting mixture to wood or plaster, there may be produced water resistant films or coatings having increased permanence against moisture. Suitable resins are thermosetting amine-aldehyde resins of the type normally used for treating paper to obtain wet strength, such as urea-formaldehyde and melamine-formaldehyde resins. It is preferred that the amount of resin shall be about 1 to 10% by weight, usually 5%, based on the amount of the crystallite aggregates. The catalyst is a conventional one, comprising a salt, acid salt, or weak acid capable of catalyzing the amine-aldehyde reaction; examples of preferred catalysts are ammonium chloride, monobasic ammonium phosphate, monobasic sodium or potassium sulfates, magnesium chloride (usually the hexahydrate), dibasic ammonium phosphate, monobasic ammonium sulfate; also weak acids like lactic, citric, tartaric, oxalic, formic, propionic, boric, or succinic acids; or a combination of sodium chloride (2.0 to 10%) and tartaric acid (0.1 to 1.0%). These aggregate-resin mixtures are also applicable to other than wood and plaster surfaces.

Of special utility for plaster surfaces are coatings deposited from water-based paints incorporating dispersions or gels of the crystallite aggregates. These paints are advantageous in that their drying rate is not too rapid, thus avoiding streakiness, and furthermore the rate is controllable by regulating the particle size and the concentration of the aggregates. A controlled drying rate favors the production of uniform coatings.

The crystallite aggregate dispersions and gels are suitable for masking selected areas on wood, plaster, glass, and other surfaces, thus permitting closely adjacent areas to be painted or coated or treated as desired. For example, a coating of aggregates may be applied to an area which is not to receive paint, after which paint is applied to the desired areas, and then, preferably when the paint is dry, the coating of aggregates may be washed away with water. The aggregate coating thus functions as a temporary removable protective coating.

Cellophane sheets may be made non-blocking by depositing thereon aggregate-containing films. It may be observed in this connection that ordinarily cellophane sheets, particularly those coated with cellulose nitrate, or polyethylene, or polyvinylchloride type coatings, when stacked in sheet form, as in supermarkets where many items are wrapped in heat-sealing cellophane, tend to stick to each other. The operator normally has difficulty in separating one sheet from another because of the static charge on the sheets. By applying a dispersion of the aggregates to the cellophane and drying the same, sticking of the sheets to each other may be prevented. Similarly, polyolefin sheet materials, such as polyethylene and polypropylene, may be rendered non-blocking, and also more slip resistant, by the application of the aggregate coatings.

Cellophane sheets may be laminated to one another by coating a surface of one sheet, or the mating surfaces of a pair of adjacent sheets, with a dispersion or never-dried gel of aggregates, preferably aggregates of one micron size or less. Upon drying the resulting structure, an excellent bond between the sheets is obtained. By plying the two sheets together so that their machine directions are angularly disposed to each other, say at right angles, there is obtained a laminated product of greatly improved tear strength. Besides cellophane, fibrous sheet materials such as paper and paperboard, and also other sheet materials, may be laminated in this way. Other laminatable materials are glass, plastic, polyolefins, rubber, cork, wood, etc. The laminant may also comprise the above-noted mixture of crystallite aggregates and the film-forming additive, or the aggregate-resin mixture.

Smooth, clear glass-like coatings on paper are producible by depositing the aggregates on a surface of the paper. For example, an aggregate-containing gel may be spread on the paper and then dried while coincidently pressing the paper between a pair of smooth, preferably heated, metal plates. The gel dries down to form a very smooth, glossy highly adherent coating, giving the paper improved tensile properties, both in the wet and dry state, and in other cases giving it a better writing surface and improved appearance. The increased tensile properties are brought about by the fact that the particles of the aggregates bond or coat the constituent fibers of the paper at their crossing points. Paper coated with the crystallite aggregates is also of value as insulating material for use in paper condensers. Reproduction paper may be made by incorporating an oil-based printing ink with the dispersion or gel and applying the resulting composition to one side of paper, and then drying, the resulting paper being suitable for reproducing writing or typing, serving, in other words, as a substitute for carbon paper.

Another application of the aggregate coatings is in the treatment of synthetic and natural fiber filaments having crenulated cross-sectional contours. Here, the dispersions or gels serve to fill up the crevices or troughs in the filament contour with a continuous film comprising very adherent particles, thus providing a filament having a smooth cross-sectional contour. The concentration of the dispersion or gel, and the particle size of the aggregates, are easily determinable to correspond with the particular fiber or filament to be coated. Such a coated filament structure has a reduced loss of tensile strength which otherwise results when filaments having crenulated non-uniform cross-sections are twisted together. Another advantage is that the filaments of smooth cross-sectional contour, particularly when formed into a fabric such as a carpet or rug, are less apt to pick up dirt. Still another advantage resides in the increased facility of processing the filaments. It may be noted that in the case of regenerated cellulose filaments having crenulated cross-sections, the addition of the aggregates provides a resulting filament in which the aggregates and the filament are compatible.

In other applications, tacky materials like sheets or slabs of unvulcanized or slightly vulcanized rubber may be coated with an aqueous dispersion of the aggregates, and after drying, the sheets may be stacked without having them adhere to each other. Sheets or other shapes of cork can be given smooth surfaces by applying a dispersion or gel to the same and drying, the aggregate particles serving to fill the pores and crevices usually found in cork.

The thickness of the coatings or films may be varied depending upon the specific structure that is coated and the specific purpose of the same. By way of illustration, the coatings may vary from about 0.0001 inch to 0.005 or 0.01 inch or more. For the thicker coatings, successive applications of the dispersions or gels may be applied, each coating being dried before the application of a succeeding coating. More concentrated dispersions, and of course gels, may be employed for the production of thicker films. The coating may cover the entire surface of an article or structure or any portion thereof, as may be desired. Colored coatings are conveniently made by adding a water-soluble or water-dispersible dye to the aqueous dispersion or gel from which the coating is to be formed. The crystallite aggregates accept dyes readily, and the dyed aggregates are applicable to any suitable basis surface which is desired to be colored. Pigments as well as dyes are useful.

The invention may be illustrated by the following examples.

Example 1

An aqueous dispersion of cellulose crystallite aggregates was prepared by first forming a 15% by weight suspension of aggregates, as obtained from the acid hydrolysis and water washing steps, in water. The aggregates had an average level-off D.P. of 220 and were in the air dried state prior to making up the suspension. In the air dried state the aggregates are white in color. The suspension was then mechanically disintegrated in a Waring Blendor for 15 minutes, a butter-like gel resulting containing 15% by weight of aggregates having a particle size ranging from less than 1 to about 250 to 300 microns. A portion of the gel was diluted with water to a 1% solids content and then allowed to stand for about a week. After this period, two layers formed, a lower layer comprising about 99% by weight of solid aggregates, which rested on the bottom of the container, and a large opalescent-appearing upper layer which contained about 0.6% by weight of the aggregates. The upper layer was decanted from the container and upon microscopic examination was found to contain particles all of which were less than 1 micron in size and which exhibited Brownian motion. This opalescent aqueous dispersion of the crystallites was then used to coat a bundle of clean glass fibers of a diameter of approximately 9 microns. Upon air drying the fibers, a colorless adherent film was formed on them. The coated fibers had a definitely soft touch, or hand, whereas in the uncoated state they had a harsh feel or hand. Also, breakage of the coated fibers, during textile processing, is very substantially reduced, by comparison with the uncoated fibers, owing to the decreased resistance to abrasion between the fibers provided by the coatings. The tenacious adherence of the coatings to the fibers was noteworthy, the coating being removable only when a sharp instrument such as a razor blade was employed to scrape it off.

Example 2

A portion of the butter-like gel of Example 1, containing 15% solids, was spread over the surface of a clean glass plate, and the plate then dried in air to produce a white frosty-appearing film thereon. When the plate and film were viewed in cross-section under the microscope, the film appeared to be made up of discrete particles or tiny projections or protuberances adhered to the glass surface with each more or less separated from its neighbors. The film could be readily shown to be a self-supporting one when the gel was spread over a wax surface, or a surface that had been pretreated with a release agent like a silicone; in this case the film could be lifted from the surface in its entirety. When a portion of the opalescent aqueous dispersion of Example 1 was applied to the surface of a clean glass plate and the resulting film viewed in cross-section under the microscope, the film appears to be homogeneous as well as continuous.

Example 3

A coating of a transparent gel consisting of particles of cellulose crystallite aggregates of an average level-off D.P. of 220 and a particle size of the order of 1 micron or less was laid down on the surface of an uncoated never-dried sheet of commercial cellophane gel film. The surface of another sheet of the same cellophane was superimposed on this to form a lamination or sandwich, and the sheets were then dried down between smooth heated platens. When this was done, the two sheets of cellophane adhered together tenaciously and provided a completely transparent cellophane sandwich.

Example 4

Two sheets of uncoated dried commercial cellophane were taken. A coating of gel of the kind used in the preceding example was deposited on the surface of one of the sheets. The sandwich was completed by superimposing the other sheet of cellophane, and it was then dried in the platens as used in the preceding example. A clear sandwich resulted in which the two sheets of cellophane were tenaciously bonded to each other.

Example 5

Two glass plates, each 6" x 4" and approximately 1/4" thick, were carefully cleaned and then dried. On the surface of one plate there was deposited a colloidal dispersion of crystallite aggregates having an average level-off D.P. of 220 and a particle size of 1 micron or less. The layer of dispersion was allowed to partially dry until it became somewhat tacky, and at this point the other glass plate was superimposed on it to form a sandwich. Drying of the sandwich was then completed in an air oven at 60° C., after the glass plates were first clamped together. A clear glass sandwich in which the two plates held together was obtained.

Example 6

In this case the experiment was the same as in Example 5 except that the coating was prepared by means of a gel like that used in Example 2. The resulting sandwich had a frosted rather than a transparent appearance, and the plates were not as tenaciously stuck to each other as in Example 5.

Example 7

Sheets of bond paper were coated with a 15% gel as prepared and used in Example 2. The coated paper was then dried between smooth heated metal platens. The resulting coating gave the paper a glass-like or glossy surface as though a sheet of cellophane had been fused to it. The coating was quite tenaciously held by the paper and did not peel off or flake.

Example 8

Using the same kind of gel and paper as in the preceding example, two sheets of paper were coated and the coated surfaces brought together and dried between platens. Excellent adhesion of the sheets to give a paper sandwich resulted.

Example 9

The experiment of Example 8 was repeated except that the gel also contained 0.2% by weight, gel basis, of carboxymethylcellulose (CMC). A very effective sandwiching of the paper was obtained, the tenacity of which was greater than in the case of Example 8.

Example 10

A gel as used in Example 2 was prepared containing 15% of the aggregates and to it there was added approximately 10% by weight of linseed oil. This mixture was used to coat paper, and the resulting coating was allowed to dry down on the paper. The coated paper was found to hold the oil quite well in that the paper was not oily, either visibly or to the touch. Of particular interest was the fact that it acted in a sense similar to carbonless types of pressure-sensitive copying paper. Upon writing on the coated paper with either pencil or pen while keeping a sheet of paper under it during the writing, it was observed that a clear reproduction, in oil, of the writing was obtained on the undersheet. The same result was obtained when an oil-soluble red dye was included in the gel-linseed oil mixture, except that the writing on the undersheet was colored red. The crystallite aggregates in the coating held the oil so that under the localized pressure of the writing instrument a part of the oil was released from the aggregates and transferred to the undersheet. With the dye present in the coating, the dye was also transferred to the undersheet to give a direct, high contrast, clear detail copy or reproduction of the writing.

In Example 10, in place of linseed oil, other non-volatile transferable agents, or vehicles, may be employed, such as alkyd, phenolic, modified alkyd-phenolic vehicles, and various resin-solvent combinations as used in conventional printing inks. Conventional solvents, oils, and driers may be incorporated in the vehicle. The coloring material may be of any suitable kind, including water-soluble and oil-soluble dyes, and also conventional pigments. It is considered that the linseed oil or other non-volatile agent or vehicle is sorbed on the crystallite aggregates, that is, it is both adsorbed and absorbed on the aggregates. As indicated, the crystallite aggregates may have a particle size in the range of less than 1 to 250 or 300 microns, preferably from less than 1 to 40 or 50 microns. The amounts of the aggregates, non-volatile agent, and coloring material are sufficient to provide a pressure transferable coating on the base sheet. Any graphic subject matter may be copied, including written, drawn and engraved matter. By written matter it is intended to include typed and printed matter. If desired, the copying sheet may have a pressure-sensitive layer or coating on both sides, so that by placing a sheet over each coated side, two reproduced uncoated copies may be made.

It is to be understood that the terms "base," "base surface," "basis surface," or "basis material" include any surface or material capable of receiving a coating of aggregates and being benefited thereby.

This application is a continuation-in-part of application Serial No. 636,639, filed January 28, 1957, now abandoned.

Although the invention has been described in connection with specific embodiments of the same, it will be understood that it is capable of obvious variations without departing from its scope.

In the light of the foregoing description, the following is claimed.

1. A food package consisting essentially of a food material selected from the group consisting of vegetables, ice cream, frozen confections, butter, cheese and meat and a self-adherent continuous coating of mechanically disintegrated cellulose crystallite aggregates having a size in the range of from less than one micron to about 300 microns, the crystallite aggregates being characterized by having an average level-off D.P. in the range of 15 to 375 anhydroglucose units.

2. A food package consisting essentially of a food material selected from the group consisting of vegetables, ice cream, frozen confections, butter, cheese and meat and a self-adherent continuous coating consisting essentially of mechanically disintegrated cellulose crystallite aggregates having a size in the range of from less than one micron to about 300 microns, the crystallite aggregates being characterized by having an average level-off D.P. in the range of 15 to 375 anhydroglucose units, and from about 1% to 10% of a water-soluble edible film-forming polymeric protective colloid.

3. A method of packaging a food material selected from the group consisting of vegetables, ice cream, frozen confections, butter, cheese and meat which comprises freezing the food material, applying a dispersion in water of mechanically disintegrated cellulose crystallite aggregates having a particle size of from less than one micron to 300 microns, the crystallite aggregates having an average level-off D.P. in the range of 15 to 375 anhydroglucose units to the food material to provide a continuous coating thereon, the dispersion containing at least 0.5% by weight of the disintegrated crystallite aggregates, drying the coating and maintaining the food material in a frozen condition.

4. A method of packaging a food material selected from the group consisting of vegetables, ice cream, frozen confections, butter, cheese and meat which comprises freezing the food material, applying a dispersion in water of mechanically disintegrated cellulose crystallite aggregates having a particle size of from less than one micron to 300 microns, the crystallite aggregates having an average level-off D.P. in the range of 15 to 375 anhydroglucose units to the food material to provide a continuous coating thereon, the dispersion containing at least 0.5% by weight of the disintegrated crystallite aggregates, the water containing dissolved therein from 1% to 10% of a water-soluble edible film-forming polymeric protective colloid, drying the coating and maintaining the food material in a frozen condition.

References Cited in the file of this patent

UNITED STATES PATENTS

| 1,804,354 | Lillienfeld | May 5, 1931 |
| 2,558,042 | Cornwell | June 26, 1951 |
| 2,868,656 | Patten | Jan. 13, 1959 |
| 2,978,446 | Battista | Apr. 4, 1961 |

OTHER REFERENCES

"Journal of Polymer Science," vol. X, No. 6, pages 577–586.

"Industrial and Engineering Chemistry," vol. 39, 1947, pages 1507–1512.